United States Patent [19]

van den Bergh et al.

[11] Patent Number: 5,117,474
[45] Date of Patent: May 26, 1992

[54] DEVICE FOR INJECTING THE LIGHT ENERGY OF A LASER BEAM INTO A FIBRE-OPTIC OPTICAL WAVEGUIDE AND A METHOD FOR ADJUSTING AND MONITORING THE POSITION OF THE END OF THE FIBRE-OPTIC OPTICAL WAVEGUIDE

[75] Inventors: Hubert van den Bergh, Goumoens-la-Ville; Peter F. Cornaz, deceased, late of Vevy; Max M. Cornaz, heir, Chesalles; Jean-Pierre Cornaz, Heir, Pratteln; Maria I. Cornaz, Heir, Berne; Georges Wagnières, Lutry, all of Switzerland

[73] Assignee: Ciba-Geigy Corporation, Ardsley, N.Y.

[21] Appl. No.: 591,536

[22] Filed: Oct. 2, 1990

[30] Foreign Application Priority Data

Oct. 3, 1989 [CH] Switzerland .......................... 3593/89

[51] Int. Cl.$^5$ .............................................. G02B 6/32
[52] U.S. Cl. ........................................ 385/39; 385/33; 385/35; 385/52
[58] Field of Search ............... 350/96.15, 96.17, 96.18; 385/15, 39, 33, 35, 49, 52

[56] References Cited

U.S. PATENT DOCUMENTS

| | | | |
|---|---|---|---|
| 4,412,720 | 11/1983 | Costa | 350/96.18 |
| 4,840,450 | 6/1989 | Jones et al. | 350/96.20 |
| 4,886,337 | 12/1989 | Raagaard et al. | 350/96.20 |
| 4,978,190 | 12/1990 | Veith | 350/96.18 |

FOREIGN PATENT DOCUMENTS 61-39006  2/1986  Japan .

Primary Examiner—John D. Lee
Assistant Examiner—Stephen W. Barns
Attorney, Agent, or Firm—Luther A. R. Hall; Harry Falber

[57] ABSTRACT

In a device for injecting the light energy of a laser beam into a multimode fibre-optic optical waveguide (2) a small part of the light emerging from the end face of the optical waveguide (2) is projected through a beam splitting cube (7) and a reproducing lens (21) onto a display screen (1), so that an image (24) of the end face of the optical waveguide (2) can be observed on the display screen (1). The arrangement is such that the system is correctly focused only when the distance between the optical waveguide (2) and a focusing point of the laser beam (12) reaches an intended value. The light spot of the laser beam on the end face of the optical waveguide (2) is clearly visible on the display screen (1) so than an optimum positioning and adjustment can be readily effected.

2 Claims, 1 Drawing Sheet

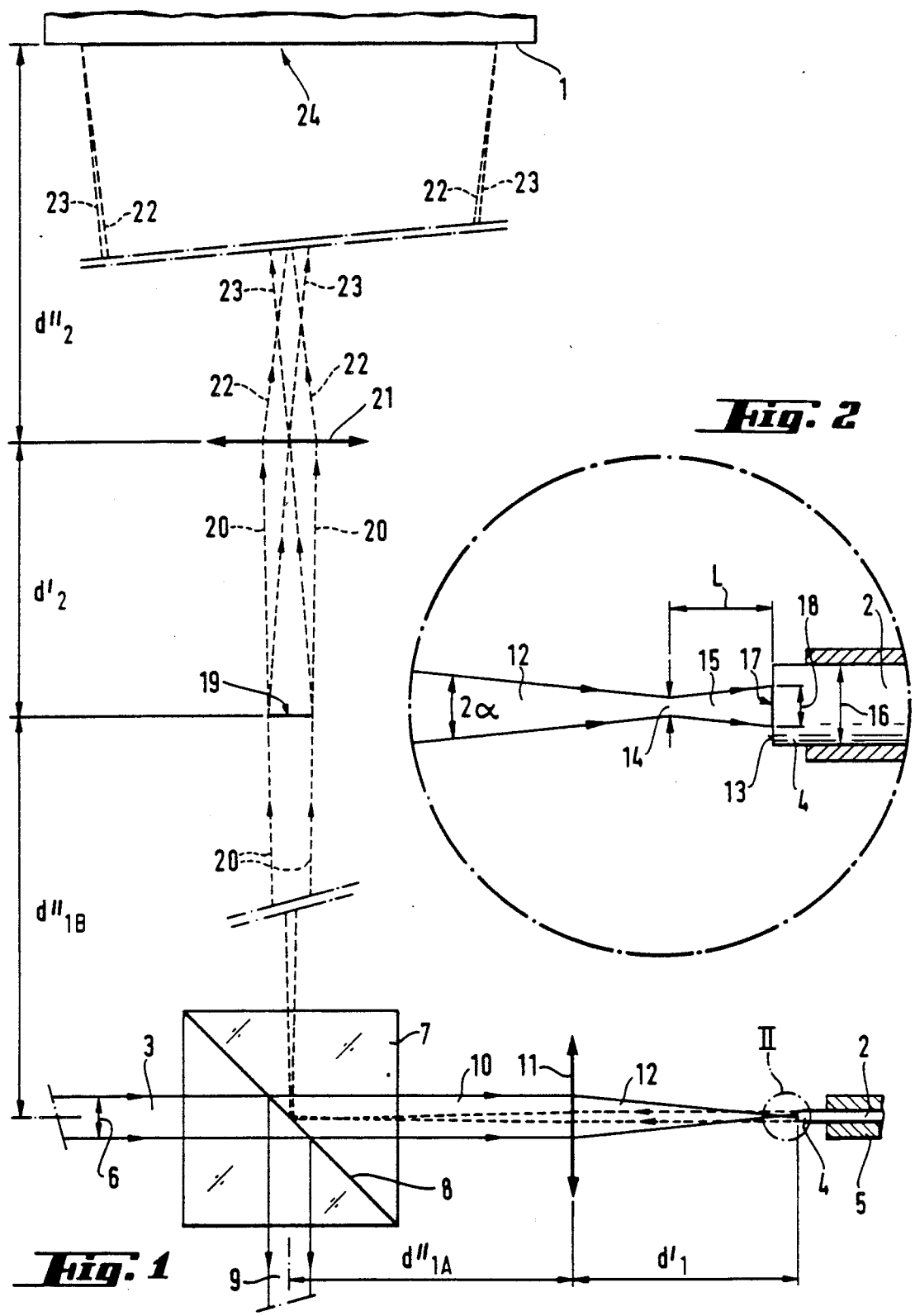

DEVICE FOR INJECTING THE LIGHT ENERGY OF A LASER BEAM INTO A FIBRE-OPTIC OPTICAL WAVEGUIDE AND A METHOD FOR ADJUSTING AND MONITORING THE POSITION OF THE END OF THE FIBRE-OPTIC OPTICAL WAVEGUIDE

The invention relates to a device for injecting the light energy of a laser beam into a fibre-optic optical waveguide, of which the end that is illuminated using a focusing lens arrangement has an end face extending at right angles to the longitudinal axis of the fibre and is fastened to a holding means capable of being positioned along three axes. In addition, the invention relates to a method for adjusting and monitoring the position of the end of a fibre-optic optical waveguide that is illuminated by a laser beam for feeding in light energy, which end is clamped in a holding means capable of being displaced in three axial directions and is illuminated by way of a focusing lens arrangement.

It is known to feed a laser beam with the aid of a focusing lens arrangement into the end of a multimode fibre-optic waveguide. In doing this it is necessary for the arrangement to be adjusted so that the laser beam meets the end face of the core of the fibre-optic optical waveguide to avoid the surroundings of the waveguide becoming heated owing to a faulty optical adjustment, which, owing to the high temperatures that occur, would lead to damage to the optical waveguide end and to its cladding. Repair of optical waveguide damaged in this manner, especially when a laser is being used in a clinical situation, can be carried out only at great inconvenience and with difficulty. To adjust the optical arrangement it is known to train light on the output end of the optical waveguide directed away from the laser in order to illuminate the end face of the optical waveguide directed towards the laser.

The invention is based on the problem of producing a device for injecting a high-output laser beam that can be reliably adjusted in a simple manner.

The invention is based on the knowledge that a part of the light energy injected into the end faces of the optical waveguide is reflected at the end of the optical waveguide remote from the laser beams and illuminates the end face facing the laser from the inside of the optical waveguide. It is therefore possible to reproduce the end face on a screen with the aid of a reproducing lens system; during a reproducing process of this kind, the light spot that the laser beam generates on the end face of the optical waveguide is reproduced simultaneously. In the device according to the invention and the method according to the invention, after the beam splitter has been introduced and the optical waveguide end has been adjusted, there is produced on the screen surface firstly an image of the end face and secondly an image of the light spot, so that with the image of the end face sharply focused it is possible within this image to displace the image of the light spot by actuating the holding means that is adjustable in three axial directions. The image of the brighter light spot remains stationary on the screen, whilst the image of the somewhat less bright and larger end face is radially displaceable. By displacing the optical waveguide axially, the position in which the end face is sharply reproduced on the screen surface and the light spot of the widened laser beam has the desired diameter can be found. Whilst the adjustment in the axial direction is still incomplete, the light spot of the laser beam is either too small or too large and the image of the end face is still blurred.

The invention is described hereinafter with reference to the drawing, in which

FIG. 1 shows a diagrammatic illustration of the optical components of the device for injecting the light energy of a laser beam according to the invention and FIG. 2 shows an enlarged section to illustrate the form of the pencil of laser rays in front of the end face of the optical waveguide and the position of the light spot of the laser beam on the end face of the fibre-optic optical waveguide to have laser light trained on it.

FIG. 1 illustrates diagrammatically in a plan view along the plane of a display screen 1 a device for injecting the light energy of a laser beam into a fibre-optic optical waveguide. The display screen 1 recognisable by its lateral edge serves for observing the adjustment of a fibre-optic optical waveguide 2 which has trained on it the light of a laser beam 3 of a laser not illustrated in the drawing.

When a comparatively high output is required, there is a risk that, as a result of its high energy, the laser beam 3 will damage the fibre-optic optical waveguide 2 if the adjustment is incorrect. The illuminated end 4 of the optical waveguide 2 is therefore clamped in a precise holding means 5, illustrated diagrammatically in the drawing, which is displaceable in three axial directions. When the laser output is low, the device allows energy losses resulting from unskilled adjustment to be avoided. One of the three axial directions extends in the longitudinal direction of the illuminated end 4 of the fibre-optic optical waveguide 2, whilst the two other axial directions define a plane extending at right angles thereto. The actuation of the holding means 5 is effected using several adjusting screws, which are also not illustrated in the drawing.

To adjust the multimode fibre-optic coupling device shown in FIG. 1, a beam splitter 7 is introduced into the path of the laser beam 3, the diameter of which is illustrated by the arrows 6, after the laser light output has been reduced in the manner illustrated in FIG. 1. The beam splitter 7 is a beam splitter cube, the reflecting face 8 of which runs at an angle of preferably 45 degrees to the propagation direction of the laser beam 3. The reflecting face 8 extends, like the surface of the display screen 1, at right angles to the plane of drawing of FIG. 1. After the holding means has been adjusted, the beam splitter is removed from the ray path again in order to avoid loss of output as a result of extraction.

When the beam splitter 7, which is required only during the adjusting operation, is located in the ray path of the laser beam 3, a part of the laser beam 3 is extracted as a pencil of dissipated rays 9. After passing through the beam splitter 7, which is in the form of a beam splitter cube, the pencil of laser rays 10 of somewhat reduced intensity passes by way of a diagrammatically illustrated focusing lens arrangement 11 as a focused pencil of laser rays 12 to the illuminated end 4 of the fibre-optic optical waveguide 2. The focusing lens arrangement 11 consists preferably of a precision-optimized achromatic lens spaced at a distance d"1A from the middle of the beam splitter 7 and at a distance d'1 from the end face 13 of the fibre-optic optical waveguide 2, which can be seen more clearly in FIG. 2 than FIG. 1; FIG. 2 illustrates the circled portion of FIG. 1 around the illuminated end 4 of the optical waveguide 2, in a view enlarged about twenty times.

As is apparent in FIG. 2, the focused pencil of laser rays 12 converges at a convergence angle 2α to a narrowest point 14 in the form of a constriction, and thereafter widens as an expanded pencil of laser rays 15 which extends as far as the end face 13, extending at right angles to the longitudinal axis of the fibre, of the illuminated end 4 of the fibre- optic optical waveguide 2, the fibre diameter of which is illustrated by an arrow 16.

The light spot 17 formed by the expanded pencil of laser rays 16 on the end face 13 has a diameter, illustrated by an arrow 18, which is smaller than the diameter of the end face 13 of the optical waveguide 2.

So that the energy fed in in the pencil of laser rays 15 is not concentrated too much, the end face 13 is spaced from the narrowest point 14 by a distance L which is selected so that the diameter of the light spot 17 is larger than the diameter of the pencil of laser rays 12 at the narrowest point 14, but smaller than the diameter of the fibre. The distance L can be selected, for example, so that the diameter of the light spot 17 is about half the diameter of the end face 13 of the optical waveguide 2, so that adjustability is good and the edge of the light spot 17 has sufficient safe clearance from the edge of the core of the optical waveguide 2. During the adjusting operation, using the holding means 5 the end 4 of the optical waveguide 2 which can be seen in FIGS. 1 and 2 is displaced in an axial direction and in a plane extending transversely thereto.

A part of the light fed by the pencil of laser rays 15 into the multimode fibre-optic optical waveguide 2 is reflected at the remote end, not illustrated in the drawing, of the optical waveguide 2 and passes from the inside of the optical waveguide 2 to the end face 13 so that this is completely illuminated from the rear side. The light reflected in this manner and used to illuminate the end face 13 corresponds to approximately 4% of the light fed in.

When correctly adjusted, the focusing lens arrangement 11 generates at an intended location in the ray path a sharp intermediate image 19 of the end face 13 illuminated from the rear side. For this purpose, the light coming from the end face 13 is guided through the focusing lens arrangement 11 as far as the reflecting face 8 of the beam splitter 7 and from there is deflected at right angles towards the display screen 1. The associated ray path is illustrated in FIG. 1 by a pair of rays 20 and, because of the large distance d"1B between the beam splitter 7 and the location of the intermediate image 19, is illustrated by interrupted lines. Depending on the positioning of the holding means 5, the location of the intermediate image 19 is displaced laterally or along the joining line between the beam splitter 7 and the display screen 1.

The intended distance between the intermediate image 19 and the beam splitter 7 is reached when the end face 13 of the optical waveguide 2 is pulled away from the narrowest point 14 by the distance L by the focusing lens arrangement 11. When the end face draws nearer to the narrowest point, the location of the intermediate image 19 is displaced, the light spot 17 becoming smaller and more intense. When the end face moves further away, the light spot 17 becomes larger and the intermediate image 19 of the end face 13, which also contains an intermediate image of the light spot 17, draws nearer to the beam splitter 7 and thus distances itself from the display screen 1.

Between the intended location of the intermediate image 19 and the display screen 1, at a distance d'2 from the intended location of the intermediate image 19 and at a distance d"2 from the display screen 1, there is a reproducing lens arrangement 21, illustrated diagrammatically in FIG. 1.

In the manner illustrated by the rays pairs 22 and 23 using interrupted lines, the reproducing lens arrangement 21 produces on the display screen 1 a reproduction 24 of the intermediate image 19 and thus of the light spot 17 and the end face 13 illuminated from the rear side. The reproduction 24 only contains a sharp image of the end face 13, however, when the intended distance L of the end face 13 from the narrowest point 14 of the laser beam 3, 10, 12, 15 has the intended value. In this manner it is possible, with fixed positions of the display screen 1, the reproducing lens arrangement 21 and the focusing lens arrangement 11, to monitor and adjust the positioning of the optical waveguide 2 after insertion of the beam splitter 7 and reduction of the laser beam output, with both an axial and a radial, accurately controllable adjustment being possible.

When the intended distance L is not accurately adhered to, the first partial image of the reproduction 24, namely the image of the end face 13, is blurred and the image of the light spot 17, recognisable on the display screen 1 as the second partial image, is too large or too small. When the end face 13 is sharply reproduced on the display screen 1, with correct adjustment the image of the light spot 17, which has a smaller diameter than that of the image of the end face 13, is positioned concentrically in the image of the end face 13. Where the adjustment is radially incorrect, the image of the light spot is displaced off-axis.

The described arrangement thus allows in a simple manner a rapid and accurate adjustment along the three spatial axes, so that damage to the optical waveguide 2 as a result of incorrect adjustments when operating with high laser light outputs can be reliably excluded.

It is also possible to use the above-described arrangement for laser beams 3 in the UV- or IR-range instead of the visible range if the display screen 1 is sensitive to ultraviolet or infrared light. For example, a CCD-chip may replace the display screen 1.

The adjustment of the entire system is found by a simple calculation, so that the position of the focus point comes to lie at the desired location.

What is claimed is:

1. A device for injecting the light energy of a laser beam into a fibre-optic optical waveguide, of which the end that is illuminated using a focusing lens arrangement has an end face extending at right angles to the longitudinal axis of the fibre and is fastened to a holding means capable of being positioned along three axes, the focusing lens arrangement generating in the ray path an intermediate image of the end face, wherein there may be inserted in the laser beam ray path, in front of the focusing lens arrangement, a beam splitter through which the light returning from the end face of the optical waveguide can be extracted laterally from the laser beam by way of a reproducing lens system onto a screen surface positioned behind said reproducing lens system, the distance of the reproducing lens arrangement from the screen surface being so selected that a sharp image of the intermediate image, produced by the focusing lens arrangement, of the end face of the optical waveguide is reproduced on the screen surface by the reproducing lens arrangement only when the end face of the optical waveguide is positioned at a prescribed distance in the direction of the fed-in laser beam behind the focal plane in which the laser beam focused with the aid of the focusing lens arrangement has the smallest diameter.

2. A method for adjusting and monitoring the position of the end of a fibre-optic optical waveguide illuminated by a laser beam for feeding in light energy, which end is clamped in a holding means capable of being displaced in three axial directions and is illuminated through a focusing lens arrangement which generates in the ray path an intermediate image of the end face, wherein, with a reduced laser output, a beam splitter is introduced into the laser beam by which the light returning from the end face of the optical waveguide is extracted laterally and is deflected by means of a reproducing lens arrangement onto a screen surface located behind said reproducing lens, the distance of the reproducing lens arrangement from the screen surface being so selected that a sharp image of the intermediate image, produced by the focusing lens arrangement, of the end face of the optical waveguide is reproduced on the screen surface by the reproducing lens arrangement only when the end face of the optical waveguide is positioned at a prescribed distance in the direction of the fed-in laser beam behind the focal plane in which the laser beam focused with the aid of the focusing lens arrangement has the smallest diameter.

* * * * *